(12) United States Patent
Halstead et al.

(10) Patent No.: US 6,931,385 B1
(45) Date of Patent: Aug. 16, 2005

(54) INTERACTIVE EXAMPLES FOR ONLINE CODING TUTORIALS

(75) Inventors: Robert H. Halstead, Belmont, MA (US); Patrick J. LoPresti, Cambridge, MA (US)

(73) Assignee: Sumisho Computer Systems Corporation, Tokyo (JP)

( * ) Notice: Subject to any disclaimer, the term of this patent is extended or adjusted under 35 U.S.C. 154(b) by 926 days.

(21) Appl. No.: 09/677,480

(22) Filed: Sep. 28, 2000

(51) Int. Cl.7 ............................................... G06N 5/00
(52) U.S. Cl. ............................ 706/46; 706/11; 706/47
(58) Field of Search ............................... 706/46, 11, 47

(56) References Cited

U.S. PATENT DOCUMENTS

| | | | | |
|---|---|---|---|---|
| 5,987,443 A | * | 11/1999 | Nichols et al. | 706/11 |
| 6,003,021 A | * | 12/1999 | Zadik et al. | 706/47 |
| 6,016,486 A | * | 1/2000 | Nichols | 706/47 |
| 6,128,759 A | | 10/2000 | Hansen | |
| 6,259,445 B1 | | 7/2001 | Hennum et al. | |

OTHER PUBLICATIONS

Kshirsagar, S. et al, Systems: Avatar Markup Language, Proceedings of the Workshop on Virtual Environments 2002, May 2002, pp. 169–177.*

M. Hostetter et al., "Curl: A Gentle Slope Language for the Web," MIT Laboratory for Computer Science World Wide Web Journal, vol. II, Issue 2, Spring 1997.

"SQL Interpreter & Tutorial with live practice database," http://www.sqlcourse.com, date unknown.

"W3Schools.com Online Web Tutorials," http://www.w3schools.com, date unknown.

"The Java™ Tutorial—A practical guide for programmers," http://java.sun.com/docs/books/tutorial, printed Nov. 29, 2001;, date unknown.

N. Petreley, "An object programming lesson on how you can be successful when doing signals and slots," InfoWorld, http://staging.infoworld.com, Mar. 31, 2000.

M. Brown et al., "Using Netscape™ 2," 2d ed., Que Corporation, c1995.

* cited by examiner

*Primary Examiner*—Wilbert L. Starks, Jr.
(74) *Attorney, Agent, or Firm*—Hamilton, Brook, Smith & Reynolds, P.C.

(57) ABSTRACT

Methods and apparatus for generating an interactive coding example for an online computer language tutorial are shown. The interactive coding example is displayed in an electronic document as part of an online computer language tutorial. An interactive example window is displayed in the electronic document by web browser software to enable the user to easily view, modify, execute, and debug the example instructions. The example source code is processed by an example execution engine in the user's computer.

21 Claims, 7 Drawing Sheets

---

Ancestors: Your ancestors include

2  *parents*
4  *grandparents*

— 46

|| Print out number of ancestors

{bold Ancestors:} Your ancestors include

{Table columns=2,
      2,    {italic parents},
      4,    {italic grandparents}
}

— 47

[ Execute ]  [ Revert ]  [ Full edit ]  [ Save as... ]  [ Close popup ]

— 48

```
{paragraph
    The following interactive example includes
    a comment, some text, and a Curl expression.
    The Curl expression in this example is a call
    to the {code sqrt} procedure, which is built
    into Curl.  (Like many programming languages,
    Curlincludes many convenient features like the
    {code sqrt} procedure that are built into the
    language.  The {code sqrt} procedure takes a
    value that you supply and returns the square root
    of that value.)  In an expression, the name of
    the procedure must immediately follow the left
    curly brace.  The value or values that you supply
    to the procedure follow the name of the procedure,
    and the right curly brace indicates the end of the
    expression.  When Curl encounters the expression
    in this example, it calls the {code sqrt} procedure,
    passing the value supplied to the procedure.  It then
    displays (in the page viewer) the value that the
    procedure returns.  In general, when the Curl Page
    Viewer encounters a top-level expression, it
    evaluates the expression and displays
    the value of the expression in the page viewer.
}
{example
    || Calling a built-in math procedure
    The square root of 4 is {sqrt 4}.
}
```

FIG. 9B

INTERACTIVE EXAMPLES FOR ONLINE CODING TUTORIALS

FIELD OF THE INVENTION

This invention relates generally to methods and apparatus for providing examples in online coding tutorials. More specifically, the present invention provides methods and apparatus for generating interactive coding examples in online tutorials for computer languages.

BACKGROUND OF THE INVENTION

The Internet and the World Wide Web (hereinafter "the web") have revolutionized the ways in which information is disseminated and shared. A wide variety of information can be simultaneously accessed by multiple users through a new category of documents designed to easily represent content for display and transmission over the Internet. These new documents, often referred to as electronic documents or web pages, are increasingly replacing their traditional paper counterparts as the medium through which business is carried out.

An electronic document is a multimedia composition that is displayed to the user on a "web browser window" by "web browser software". Electronic documents may contain text, audio, graphics, imagery, and video content, as well as nearly any other type of content that may be experienced through use of a computer or other electronic devices. Additionally, electronic documents may be interactive, and may contain user selectable links that cause other electronic documents to be accessed.

Electronic documents are used in many creative and diverse fields, including entertainment, commerce, government, and education. In particular, the easy access to information in electronic documents has transformed education, enabling students and teachers to participate in a rich learning environment. Lectures, research materials, and other course components may be made available on demand, allowing students with a computer connected to the Internet to have access to educational material from any place at any time.

The Internet provides a very effective environment for the collaborative learning of various topics, especially when it involves the use of a computer, such as, for example, learning computer languages. Students can access a number of online tutorials on computer languages, learn about the languages' keywords and syntax, and immediately apply the concepts learned in the tutorials by writing and executing programs on the same computer where the tutorials are being displayed. The students can further share their programs with others for review, by including them in electronic documents accessible over the Internet. This process has considerably facilitated the learning of computer languages for many users, including the growing community of non-technically savvy users who desire to be proficient in creating computer applications.

Online computer language tutorials are essentially a set of electronic documents explaining the language syntax and providing examples on how the language is used to implement computer programs. The examples are usually a set of instructions or exercises for the user to perform. Some online tutorials may provide an interactive window in the electronic document, such as an editing window, for the user to type in the example instructions. This activity takes place in the user's computer, with the web browser software displaying the example instructions and the interactive window. The user may select a "submit" button associated with the interactive window for execution of the example instructions. Once the submit button is selected, the web browser software establishes a connection over the Internet between the user's computer and a "web server", which is responsible for the execution of the instructions typed in the interactive window displayed in the user's computer. The example instructions are then processed by the web server, and the results are sent back to the user's computer over the Internet. The results of the example instructions are displayed in another electronic document in the user's computer once the web browser software handles the web server's response.

This type of online tutorial has several significant drawbacks. First, depending on the Internet connection the user has, it may take several minutes for the user to type the example instructions in the interactive window of the electronic document, send the example instructions for processing at the web server, and get the results back. Under heavy Internet congestion, it may take several processing requests before the web server responds with the example results. This problem is accentuated if the example itself requires user interaction.

Second, this type of online tutorial does not enable the user to easily and quickly modify the example instructions to see how they could be adapted to a particular situation. Modifying the example instructions would require the user to perform several steps, including: (1) executing the original example instructions; (2) sending the appropriate requests to the server; (3) analyzing the example results; (4) generating the modified set of instructions; (5) sending the new requests to the server for executing the modified instructions; and (6) analyzing the new example results and comparing them to the original example results. This process may be repeated multiple times, and in certain circumstances, it may be hard for the user to keep track of which changes in the example instructions produced which set of results. This usually occurs when the results are displayed in several "pop-up windows" that may be accidentally closed by the user, or when the results are displayed in the same web browser window used by the tutorial to display the original instructions, which would require the user to select the "back" button on the web browser repeatedly to view the original instructions. The latter approach is the one adopted by an online tutorial on the SQL database language.

Finally, if the user makes an error when typing the example instructions, the server typically responds with an error message that simply says an error occurred without giving the user further indications of why the typed example instructions could not be executed properly. Users may get frustrated with the lack of guidance provided by such examples.

In view of the drawbacks above, it would be desirable to provide methods and apparatus for generating coding examples in online tutorials for computer languages that overcome these drawbacks.

It would further be desirable to provide methods and apparatus for generating coding examples in electronic documents that can be processed in the user's computer.

It would still further be desirable to provide methods and apparatus for generating interactive coding examples in electronic documents that enable the user to easily view, modify, and execute the example instructions.

It would also be desirable to provide methods and apparatus for generating coding examples that provide suitable error messages when the user makes a mistake when writing the example source code.

SUMMARY OF THE INVENTION

In view of the foregoing, it is an object of the present invention to provide methods and apparatus for providing interactive coding examples in online computer language tutorials that overcome the various drawbacks described hereinabove.

It is another object of the present invention to provide methods and apparatus for generating coding examples in electronic documents that can be processed in the user's computer.

It is a further object of the present invention to provide methods and apparatus for generating interactive coding examples in electronic documents that enable the user to easily view, modify, and execute the example instructions.

It is also an object of the present invention to provide methods and apparatus for generating coding examples that provide suitable error messages when the user makes a mistake when writing the example source code.

These and other objects of the present invention are accomplished by providing methods and apparatus for generating interactive coding examples that enable an user to easily view, modify, and, execute the examples on the user's computer. The interactive examples are embedded in electronic documents that are part of online tutorials for computer languages.

In a preferred embodiment, the methods of the present invention for providing interactive examples in online coding tutorials involve three major steps: (1) defining an example markup in the language used to generate the electronic documents for the online tutorials; (2) processing the example content to convert it into a displayed form; and (3) creating an interactive example window.

More specifically, the present invention provides a specially designed example markup to create and display interactive example windows in online computer language tutorials. The interactive example window contains three sub-windows, hereinafter referred to as "widgets", consisting of: (1) an interactive editing widget for displaying the example content and enabling the user to modify the example content; (2) a control affordances widget containing a set of control buttons for the user to apply to the example content; and (3) an example result widget for displaying the example results and allowing the user to interact with the example result.

An important advantage of the present invention inheres in the fact that all operations performed by the user on the interactive example may be processed in the user's computer. This avoids connecting to a web server, sending requests to the web server to perform the operations, and waiting for the web server to respond with the operations' results.

Another technical advantage of the present invention inheres in the fact that it enables users to easily and quickly modify the example source code, analyze the example results, debug the example content, and repeat the process using the same interactive example window.

Other technical advantages of the present invention will become apparent to one of ordinary skill in the art in view of the drawings and detailed description of the embodiments of the invention.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which:

FIGS. 9A and 9B show an example web browser window displaying an online coding tutorial containing an interactive example window and the source code used to display the online coding tutorial and example in the web browser window.

DETAILED DESCRIPTION OF THE INVENTION

The present invention provides interactive coding examples in online computer language tutorials that are designed as electronic documents. It should be noted that as used herein, an "electronic document" comprises a source file or collection of files written using one or more language tools for displaying content accessible with web browser software. The content may consist of text, audio, graphics, imagery, and video, as well as any other type of content that may be experienced through use of web browser software. Additionally, electronic documents may be interactive, and may contain user selectable links that cause other electronic documents to be accessed.

As used herein, online computer language tutorials consist of a collection of electronic documents containing specialized content describing the computer language syntax and other language features and how they are used to implement computer programs. The computer language may be any type of language designed to enable humans to communicate with or control computers, including programming languages such as C, markup languages such as HTML, script languages such as PERL, and database query languages such as SQL, among others. The online tutorials may contain coding examples showing how to use language elements and expressions to implement certain features in computer programs. The coding examples may also be interactive, containing control buttons for the user to operate to better understand how the coding example works.

Figure 1:
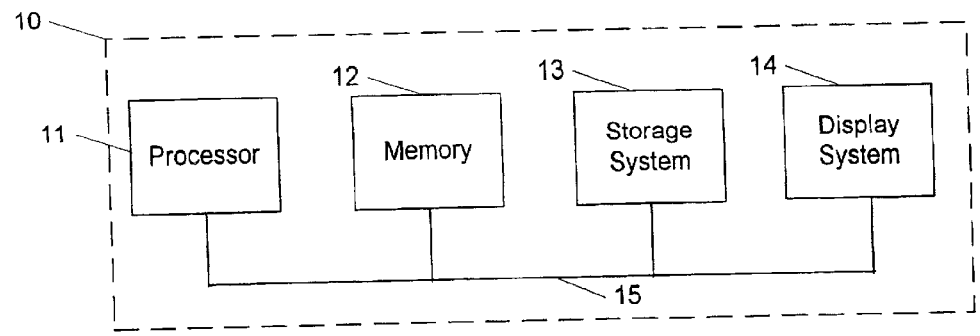
FIG. 1 is a schematic view of a computer system suitable for use with the present invention.

Referring to FIG. 1, a computer system suitable for use with the present invention is described. Computer system 10 includes at least processor 11, for processing information according to programmed instructions, memory 12, for storing information and instructions for processor 11, storage system 13, such as a magnetic or optical disk system, for storing large amounts of information and instructions on a relatively long-term basis, and display system 14, such as a computer monitor, for displaying various graphical elements that facilitate user interaction with computer system 10. These graphical elements include graphical user interfaces (GUI) of software applications, windows for displaying Internet content through a web browser, and various "pop-up" windows that are triggered by user interaction with a given application, such as pop-up windows that display the results of an online coding example.

Memory 12 contains instructions for web browser software as well as for an "example execution engine", consisting of instructions for executing source code examples in online computer language tutorials. The execution engine may be embedded in a web browser, may be a software plug-in for the web browser, or it may be a stand-alone software application. In the latter case, the web browser software would contain instructions for accessing the; execution engine. Processor 11, memory 12, storage system 13, and display system 14 are coupled to bus 15, which preferably provides a high-speed means for devices connected to bus 15 to communicate with each other.

It will be apparent to one of ordinary skill in the art that computer system 10 is illustrative, and that alternative systems and architectures may be used with the present invention. It will further be understood that many other devices, such as a network interface (not shown), and a variety of other input and output devices (not shown) may be included in computer system 10.

Figure 2:
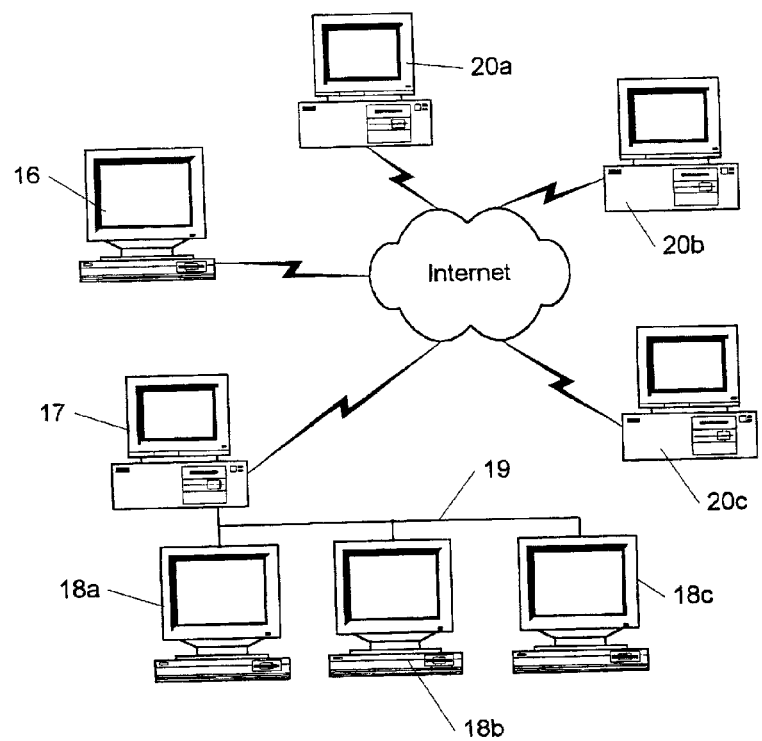
FIG. 2 shows the network environment in which the present invention operates.

Referring now to FIG. 2, an overview of a network environment in which a preferred embodiment of the present invention operates is shown. Client computer 16 ("client") uses web browser software to communicate across the Internet with server computer 17 ("server"). Server 17 executes web server software to process requests from client computers on the Internet, such as client computer 16. Server 17 responds to these requests by sending electronic documents, executable code, or data to client 16, which may be part of an online computer language tutorial for display with the web browser software in client 16. In accordance with the present invention, interactive examples embedded in the tutorial are executed by an example execution engine on client 16.

Additionally, server 17 may contain "search engine" software for locating electronic documents on the Internet. Server 17 may also handle database management tasks, as well as a variety of administrative tasks, such as compiling usage statistics. Alternatively, some or all of these tasks may be performed by computers 18a–c, connected to server 17 through local area network 19. It will be understood by one skilled in the art that there are millions of web servers connected to the Internet, and millions of client computers running web browser software. If server 17 has sufficient capacity, at any given time it may be in communication with thousands off client computers.

Web servers 20a–c are computers that provide access to electronic documents that may be found through use of a search engine provided by server 17. When a user of client 16 selects an electronic document from the search engine results provided by server 17, client 16 may communicate across the Internet with one of web servers 20a–c.

Further, one skilled in the art will understand that the present invention could also be used in other network settings. For example, rather than connecting through the Internet, the apparatus and methods of the present invention could be used on a local area network. In such a configuration, the clients and server would all be connected to the same local area network. The methods and apparatus of the present invention may also be used in configurations in which the clients are also servers, that is, the clients and servers are the same computer. This would reduce the communications latency between user requests on the client and response to the user requests on the server.

Figure 3:
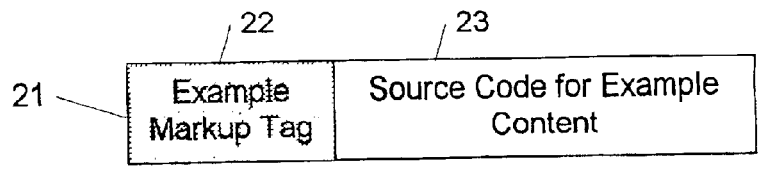
FIG. 3 illustrates the example markup used to include examples in online tutorials.

Referring now to FIG. 3, an example markup used to include coding examples in an electronic document that is part of a computer language tutorial is described. A "markup" refers to a sequence of characters or other symbols that are inserted at certain places in the source code file of an electronic document to indicate how the electronic document should look when it is printed or displayed, or to describe the electronic document's logical structure. The markup indicators are often called "tags", and may comprise a starting tag and a termination tag. Tags are usually followed by source code content that is executed and displayed in the electronic document. In case the markup indicator consists of a starting tag and a termination tag, source code content is included between the starting tag and the termination tag. For example, using the <UL> (starting tag for an unnumbered list), </UL> (termination tag for an unnumbered list), and <LI> (list item) tags in the HTML language to display a list of fruits would require the following piece of source code in the electronic document:

```
<UL>
   <LI> apples
   <LI> bananas
   <LI> grapefruit
</UL>
```

The web browser software would display the following output in the web browser window:

apples
bananas
grapefruit

Markup tags can be inserted by the electronic document creator directly by typing the symbols in the source code file of the electronic document, by using an editor and selecting prepackaged markup symbols (to save keystrokes), or by using a more sophisticated editor that enables users to create the document as they want it to appear.

Example markup 21 comprises example markup tag 22, which is defined according to the specifications of the language used to create the electronic document. Example markup tag 22 may be the string "<example>" or any other string defined in the, language specification for including source code for example content 23 in the electronic document. For example, in an online tutorial for HTML, an example markup may be created and placed in a tutorial for showing the user how to create a list of fruits as described above. The example markup may consist of the following source code;

```
<example>
   This is a list of fruits.
   <UL>
      <LI> apples
      <LI> bananas
      <LI> grapefruit
   </UL>
</example>
```

The source code content included in the example markup is executed at the client computer by an example execution engine.

Figure 4:
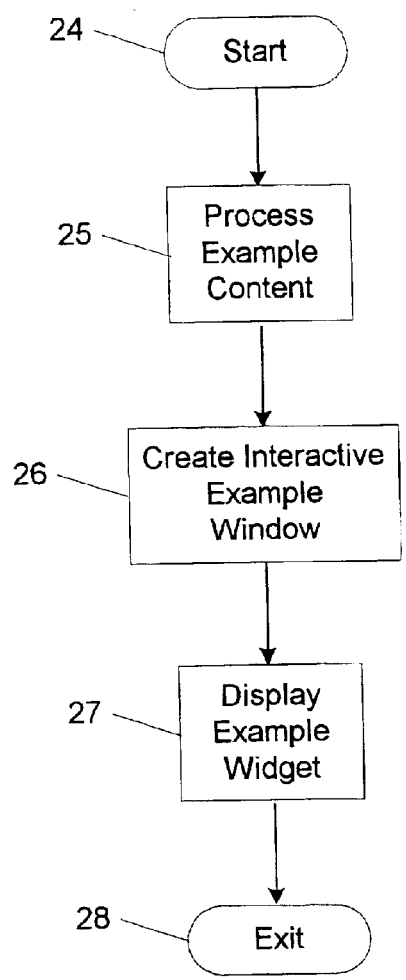
FIG. 4 is a flow chart for executing the example markup.

Referring now to FIG. 4, a flow chart for executing example markup 21 is described. At step 251, the example execution engine processes the example source code to produce the example result. The example source code may contain simple instructions for displaying text such as the list of fruits example above, or it may generate more sophisticated applications, involving audio, imagery, video, and user interactivity. An interactive example window is created at step 26 to display the example source code, the example result, and control mechanisms to enable users to easily and quickly modify the example source code, analyze the example results, debug the example source code, and repeat the process using the same interactive example window. The interactive example window is displayed in a web browser window at step 27.

Figure 5:
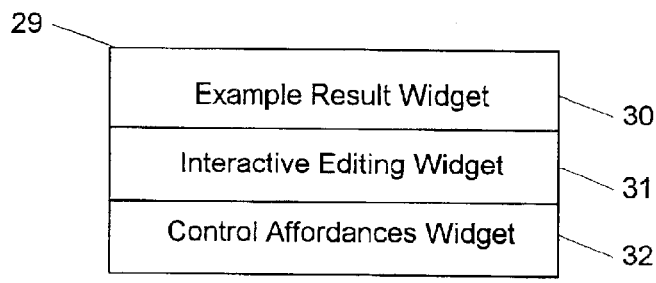
FIG. 5 is a schematic view of a preferred embodiment of an interactive example window for use with the present invention.

Referring now to FIG. 5, a preferred embodiment of an interactive example window for use with the present invention is described. Interactive example window 29 is a two-dimensional viewing area in the web browser display that allows users to view the example source code and results, as well as modify and execute the example. Interactive example window 29 contains three sub-windows, or widgets: example result widget 30, interactive editing widget 31, and control affordances widget 32. Example result widget 30 is a viewing area for displaying the results of the execution of the example source code content, displayed in interactive editing widget 31.

Interactive editing widget 31 is a simple editor that allows a user to modify the example source code content in editing widget 31 and directly typing the desired source code modifications. Preferably, editing widget 31 supplies common editing features such as copying and pasting. Operations on interactive editing widget 31 such as executing the example source code and restoring the displayed example source code to its original form are performed when the user interacts with control buttons provided in control affordances widget 32.

Figure 6:
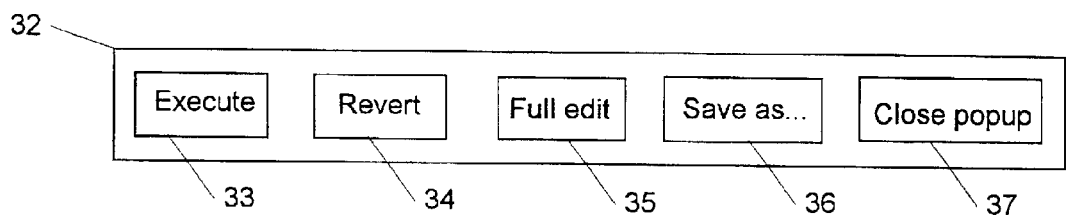
FIG. 6 is a schematic view of a preferred embodiment of a control affordances widget for the interactive example window.

Referring now to FIG. 6, a preferred embodiment of a control affordances widget for an interactive example window is described. Control affordances widget 32 may include the following control buttons for accepting user interaction: "execute" control button 33, "revert" control button 34, "full edit" control button 35, "save as" control button 36, and "close pop-up" control button 37. When the user selects execute control button 33, the example execution engine processes the example source code displayed in interactive editing widget 31 and displays the example results to the user. The example results may be displayed in example result widget 30, or in a "pop-up" window. Revert control button 34 may be selected by the user to display the original example source code in interactive editing widget 31. This option may be selected in case the user wants to compare the original example source code with any source code modifications the user makes in interactive editing widget 31.

A more complete editing window may be opened by the user by selecting full edit control button 35. Selecting this button causes a pop-up editor window to be displayed in the user's computer display screen. The pop-up window contains the example source code content displayed in interactive editing widget 31 and may be integrated with the development environment for the language used to write the example source code. This enables the user to more easily edit, execute, and debug the example source code. In case the user wants to save the example source code in a separate file, the user may select "save as" control button 36. "Close pop-up" control button 37 may be selected to close a pop-up window displaying example results.

Figure 7:
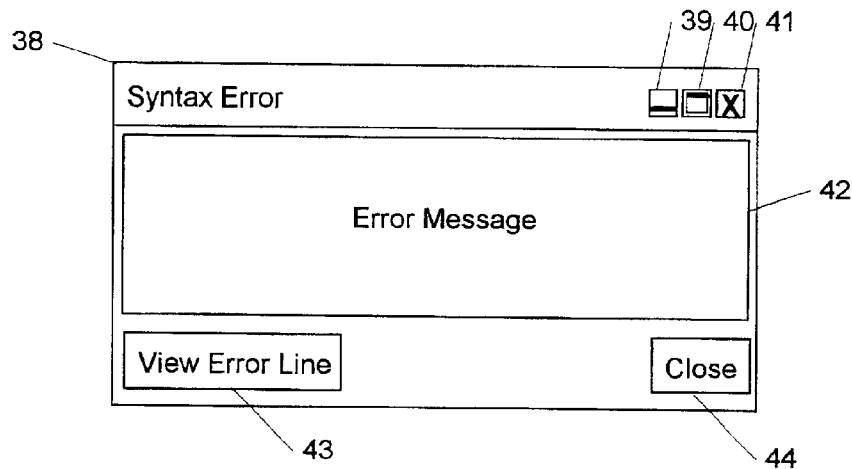
FIG. 7 shows an error message window for use with the present invention.

Referring now to FIG. 7, an error message window for use with the present invention is described. Error message window 38 is a learning aid offered with the interactive example so the user may easily debug and understand mistakes made when modifying the example source code. Error message window 38 contains standard buttons 39, 40, and 41, for minimizing, maximizing, and closing the window, respectively. Error message 42 contains text revealing to the user the mistakes made when modifying the example source code, with possible: suggestions as to where in the source code each mistake was made. Error message window 38 contains "view error line" control button 43 that, when selected, opens a full editor window displaying the modified source code. The line in the source code containing the error is highlighted in color or otherwise marked to call attention to the error. The user may then correct the error in the opened full editor window, copy the corrected source code text into interactive editing window 31, and execute the example by selecting execute control button 33.

Figure 8A:
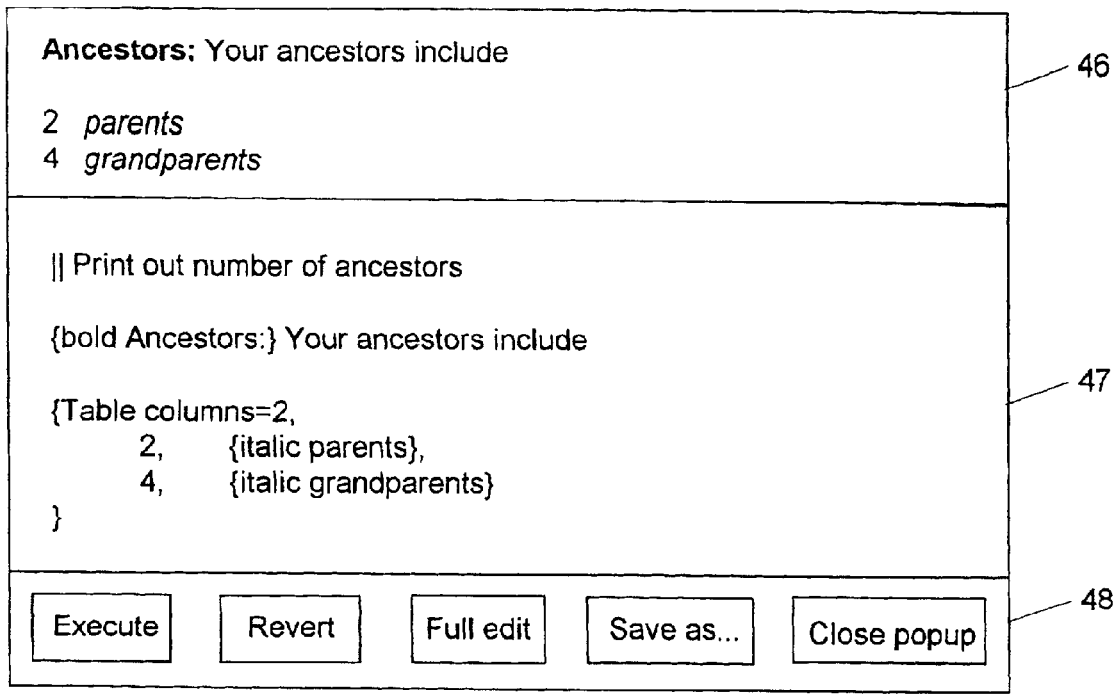
FIGS. 8A, 8B, 8C, 8D, and 8E show an example use of the present invention.

Referring now to FIGS. 8A, 8B, 8C, 8D, and 8E, an example of using the method of the present invention is described. Referring to FIG. 8A, interactive example window 45 shows exemplary CURL language source code for printing out a list of ancestors. The CURL content programming language and its features are described in the commonly owned, copending, U.S. patent application Ser. No. 09/677,482.

Interactive example window 45 is displayed in an electronic document that is part of an online tutorial for the CURL language. The example source code is displayed in interactive editing widget 47, and the result of executing the example source code is shown in example result widget 46. The user may interact with the example by modifying the example source code displayed in interactive editing widget 47 and by using one of the control buttons displayed in control affordances widget 48.

Figure 8B:
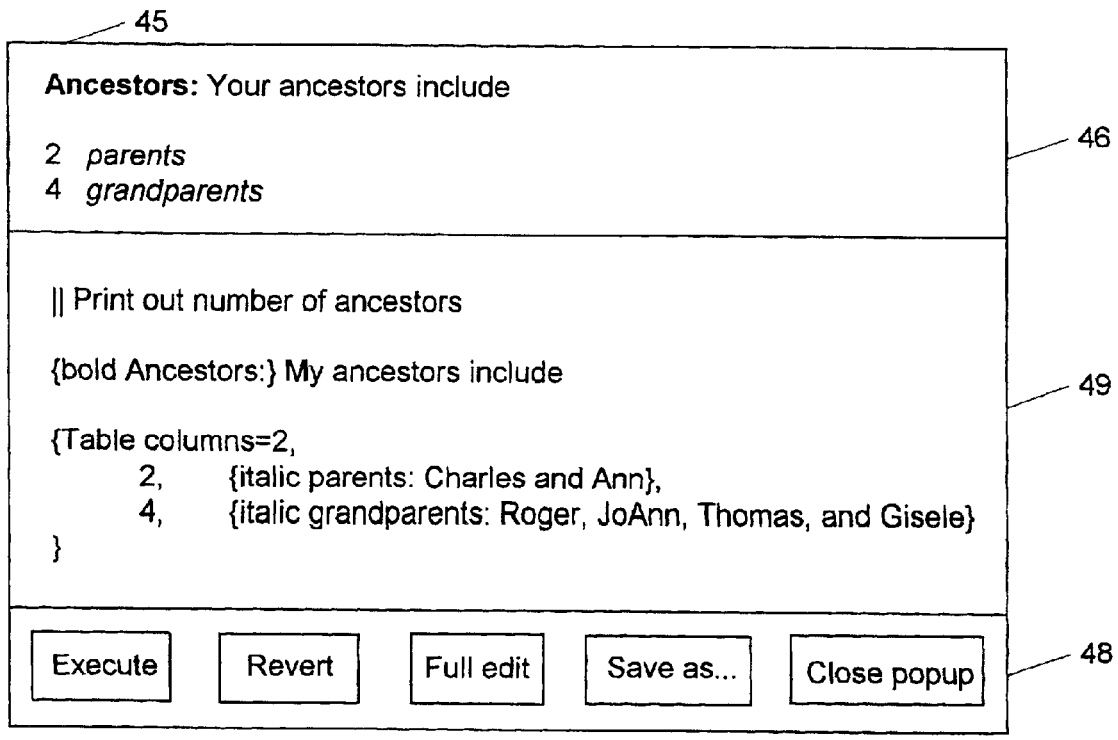
Figure 8C:
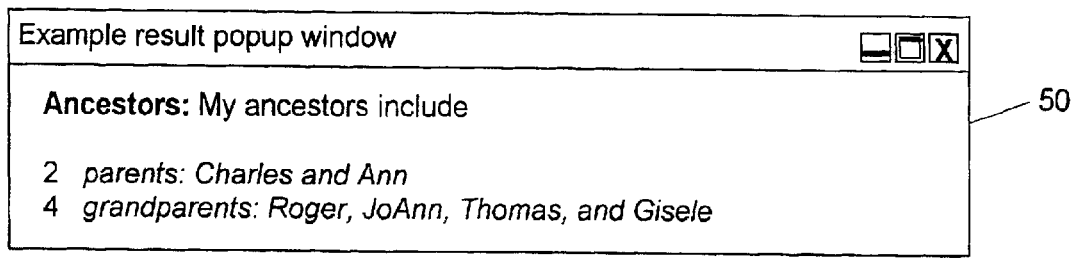

Referring to FIG. 8B, interactive example window 45 shows that the example source code in interactive editing widget 49 has been modified by changing "Your ancestors" to "My ancestors" and adding the ancestors' names. By clicking on the execute control button of control affordances widget 48, the modified example is executed by the example execution engine in the user's computer. Referring to FIG. 8C, example result pop-up window 50 is a pop-up window that displays the results of executing the modified example source code. Alternatively, the example results may be displayed in example result widget 46.

Figure 8D:
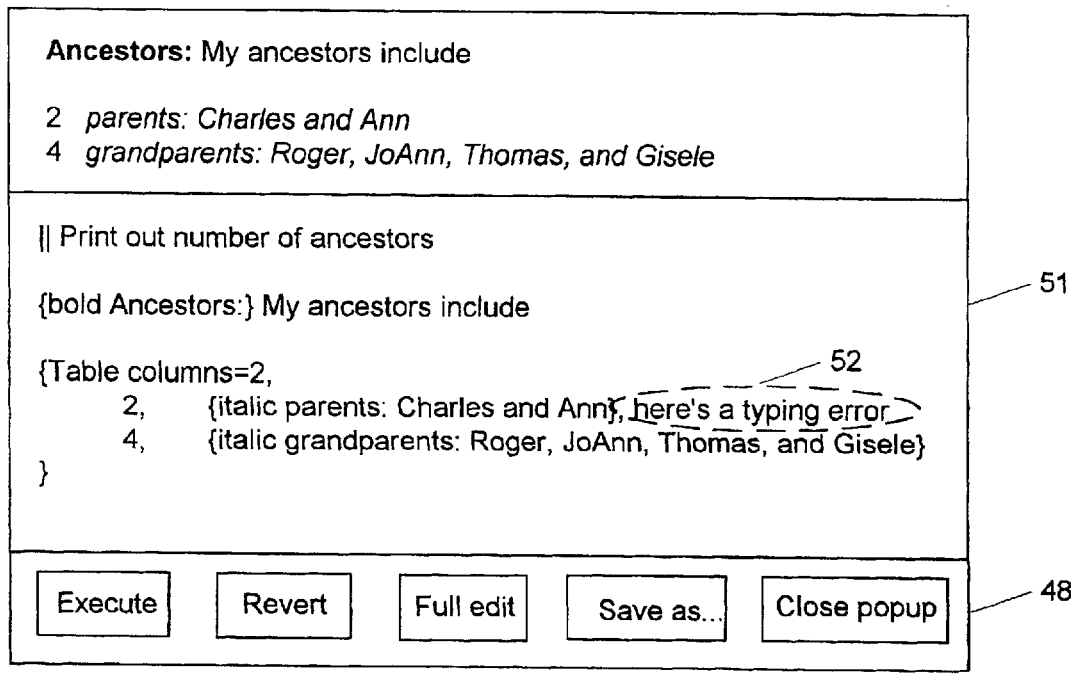
Figure 8E:
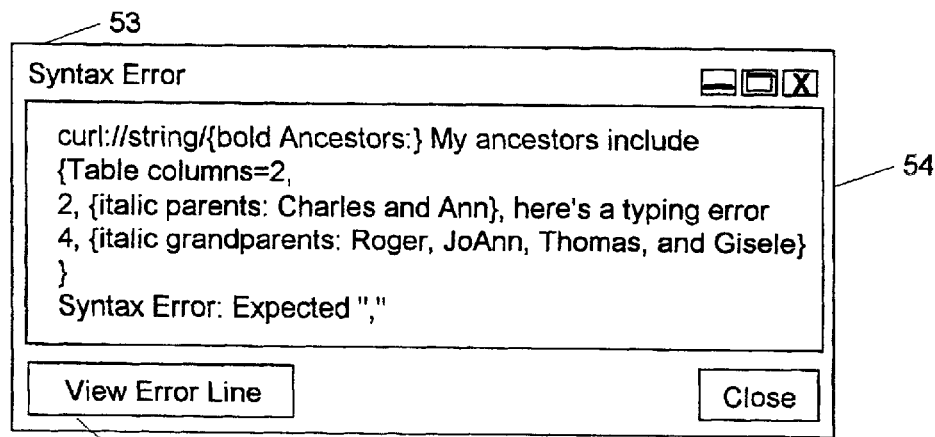

Referring now to FIG. 8D, interactive editing widget 51 shows modified example source code that contains typing error 52. When the user selects the execute control button in control affordances widget 48, an error will occur. Referring now to FIG. 8E, error message window 53 is displayed to the user to indicate that an error occurred in the execution of the example source code. Error message window 53 shows error message 54, containing detailed information about the type of error made by the user. Error message window 53 also contains "view error line" control button 55 to open a full edit window displaying the example source code. The full edit window highlights the text line in the example source code that contains the error, thus facilitating the error debugging and the learning of the programming language.

Figure 9A:
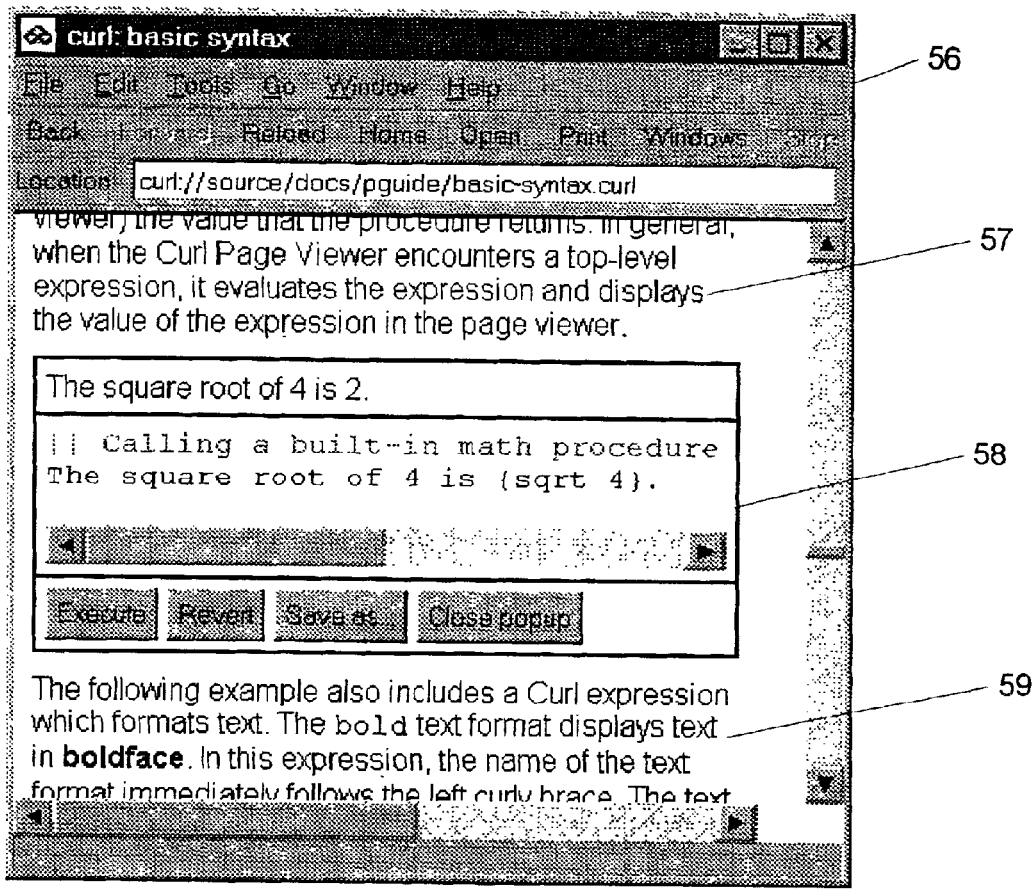

Referring now to FIG. 9A, an example web browser window displaying an online coding tutorial containing an interactive example window is shown. Web browser window 56 displays text 57 and 59 explaining features of the CURL language. Example window 58 displays an example for computing the square root of a number and can be modified by a user as described above.

The example source code for displaying the online coding tutorial text and example shown in FIG. 9A in a web browser window is shown in FIG. 9B. The example source code in the CURL language contains paragraph markup 60 and example markup 61 for displaying a text paragraph and an interactive example window, respectively. Text paragraph 62 refers to a feature of the CURL language used in example 63. Example markup 61 causes example 63 to be displayed in interactive example window 58 of FIG. 9A.

Although particular embodiments of the present invention have been described above in detail, it will be understood that this description is merely for purposes of illustration. Specific features of the invention are shown in some drawings and not in others, and this is for convenience only and any feature may be combined with another in accordance with the invention. Steps of the described processes may be reordered or combined, and other steps may be included. Further variations will be apparent to one skilled in the art in light of this disclosure and are intended to fall within the scope of the appended claims.

Further, one skilled in the art will understand that the methods and apparatus of the present invention could also be used to provide examples for a variety of online tutorials, such as tutorials for architectural software packages, tutorials for electrical circuit simulators, and tutorials for network simulators, among others.

What is claimed is:

1. A method to implement an online interactive coding tutorial for a computer language comprising:

defining an example markup indicator that is used to create an interactive coding tutorial having modifiable source code; and responding to a request to process the modifiable source code by providing a result based on the modifiable source code.

2. A method according to claim 1 wherein the example markup indicator is a predefined markup tag in a computer language that is used to create the interactive coding tutorial.

3. A method according to claim 2 wherein the modifiable source code is written in the same computer language as the predefined markup tag.

4. A method according to claim 1 wherein the interactive coding tutorial is an electronic document displayed in a web browser interface.

5. A method according to claim 4 wherein the example markup indicator is embedded in the electronic document.

6. A method according to claim 1 wherein the interactive coding tutorial having modifiable source code further includes enabling a user to edit the modifiable source code in an electronic document.

7. A method according to claim 6 wherein the request to process the modifiable source code is generated in response to a selection by the user.

8. A method according to claim 1 wherein processing the modifiable source code further includes:

executing the modifiable source code to produce the result; and causing the result to be displayed in the interactive coding tutorial.

9. A method according to claim 8 wherein executing the modifiable source code to produce the result further includes:

determining errors in the modifiable source code; and responding to the errors by displaying the errors in the interactive coding tutorial.

10. A method according to claim 1 wherein processing the modifiable source code further includes at least one of:

compiling the modifiable source code;

interpreting the modifiable source code; or translating the modifiable source code.

11. A software system to implement an online interactive coding tutorial for a computer language comprising:

an execution engine that includes computer readable instructions for processing an example-markup including instructions that:

recognize an example markup identifying modifiable source code for an interactive coding example; and to a request to process the modifiable source code by producing a result based on the modifiable source code.

12. A software system as in claim 11 wherein the example markup is a string of predefined characters in a computer language.

13. A software system as in claim 12 wherein the modifiable source code is written in the same computer language as the example markup.

14. A software system as in claim 11 wherein the example markup directs the execution engine to display the modifiable source code in a web browser.

15. A software system as in claim 11 wherein the example markup is embedded in an electronic document in the interactive coding tutorial.

16. A software system as in claim 11 wherein the modifiable source code is modifiable by a user.

17. A software system as in claim 11 wherein the request to process the modifiable source code is generated in response to a selection by the user.

18. A software system as in claim 11 wherein the instructions for processing the modifiable source code further include instructions that:

execute the modifiable source code to produce the result; and cause the result to be displayed in the interactive coding tutorial.

19. A software system as in claim 18 wherein the instructions that execute the modifiable source code to produce the result further include instructions that:

determine errors in the modifiable source code; and to the errors by generating an error message in the interactive coding tutorial.

20. A software system as in claim 11 wherein the instructions to process the modifiable source code further include instructions to perform at least one of:

compiling the modifiable source code;

interpreting the modifiable source code; or translating the modifiable source code.

21. A system to implement an online interactive coding tutorial for a computer language comprising:

means for defining an example markup indicator that is used to create an interactive coding tutorial having modifiable source code; and means for responding to a request to process the modifiable source code by providing a result based on the modifiable source code.

\* \* \* \* \*

UNITED STATES PATENT AND TRADEMARK OFFICE
CERTIFICATE OF CORRECTION

PATENT NO.     : 6,931,385 B1
DATED          : August 16, 2005
INVENTOR(S)    : Robert H. Halstead et al.

It is certified that error appears in the above-identified patent and that said Letters Patent is hereby corrected as shown below:

Column 10,
Line 7, "example-markup" should read -- example markup --.
Line 12, before "to a request", insert -- respond --.
Line 45, before "to the errors", insert -- respond --.

Signed and Sealed this

Twenty-second Day of November, 2005

JON W. DUDAS
*Director of the United States Patent and Trademark Office*